United States Patent
Cottingham et al.

(10) Patent No.: US 12,385,314 B2
(45) Date of Patent: Aug. 12, 2025

(54) COVER DEPLOYMENT SYSTEM

(71) Applicant: Tarpstop, LLC, Perrysburg, OH (US)

(72) Inventors: Brent R. Cottingham, Grand Rapids, MI (US); Aaron Vail, Grand Rapids, MI (US); Justin Bjorum, Wyoming, MI (US)

(73) Assignee: Tarpstop, LLC, Perrysburg, OH (US)

( * ) Notice: Subject to any disclaimer, the term of this patent is extended or adjusted under 35 U.S.C. 154(b) by 627 days.

(21) Appl. No.: 17/829,647

(22) Filed: Jun. 1, 2022

(65) Prior Publication Data

US 2023/0392429 A1 Dec. 7, 2023

(51) Int. Cl.
*B60J 7/12* (2006.01)
*E05F 15/643* (2015.01)

(52) U.S. Cl.
CPC ........... *E05F 15/643* (2015.01); *B60J 7/1204* (2013.01); *E05Y 2201/434* (2013.01); *E05Y 2201/654* (2013.01); *E05Y 2201/656* (2013.01); *E05Y 2201/668* (2013.01); *E05Y 2201/71* (2013.01); *E05Y 2900/516* (2013.01)

(58) Field of Classification Search
None
See application file for complete search history.

(56) References Cited

U.S. PATENT DOCUMENTS

| | | | |
|---|---|---|---|
| 3,942,830 A | 3/1976 | Woodard | |
| 6,142,554 A | 11/2000 | Carroll et al. | |
| 7,367,606 B2 * | 5/2008 | Ellis | B60J 7/062 296/100.11 |
| 7,484,789 B1 * | 2/2009 | Aulick | B60J 7/062 296/100.18 |
| 8,579,353 B1 * | 11/2013 | Aulick | B60J 7/062 296/100.18 |
| 9,555,698 B2 | 1/2017 | Damsi et al. | |

* cited by examiner

*Primary Examiner* — Joseph D. Pape
(74) *Attorney, Agent, or Firm* — MacMillan, Sobanski & Todd, LLC

(57) ABSTRACT

A cover deployment system includes a flexible cover configured to span an open top of a trailer, the trailer having a front end, a rear end, and longitudinally extending side walls extending therebetween, bow assemblies connected to the cover, and a cable system including a pair of cables, an electric actuator, a manual actuator, and a differential. The cables extend longitudinally along the longitudinal side of the trailer. Each cable defines a loop supported by a pulley at the front end of the trailer and a pulley at the rear end of the trailer. The remaining bow assemblies are movably attached to the cables. The electric actuator and the manual actuator are operatively connected to a differential positioned between the electric actuator, the manual actuator, and the pulley. The differential is connected and rotates a pulley to move the cables, thereby moving the cover between closed and open positions.

18 Claims, 19 Drawing Sheets

COVER DEPLOYMENT SYSTEM

BACKGROUND OF THE INVENTION

This invention relates in general to covering systems used in tractor-trailer hauling applications. In particular, this invention relates to a power actuated top covering system for selectively covering the open top area of a trailer having rigid side walls.

Commercial truck trailers are produced in a variety of forms to support and haul a variety of goods. Flatbed trailers are designed to haul heavy loads, such as coiled steel or larger pieces of equipment, and permit these loads to be placed on the trailer surface easily. Box trailers tend to haul lighter packaged goods that need to be protected from wind loads during transport. Open top, dump trailers configured to haul generally loose and dry goods, such as grain, sand, gravel, and the like, have generally rigid side walls and a rear mounted gate or a bottom-mounted chute or door. The open top permits the goods to be loaded into the trailer. The gate permits goods to be released as the trailer is tilted. The bottom-mounted door permits unloading without the need to tilt the trailer.

Open top dump trailers, because of the loose nature of their cargo, are often covered to prevent road wind from blowing the trailer contents onto the roadway and onto other vehicles following behind. Many states require certain types of loose cargo to be covered to prevent debris from impacting other vehicles. These top coverings may be canvas or rigid panels. Canvas coverings are usually rolled, either to one side or an end of the trailer, to deploy or remove the cover. The rolling mechanism may include a U-shaped "towel" bar that extends along the outer surface of the side walls and pivotally mounts to the lower portion of the trailer. The tarp is rolled onto or off the towel bar portion that extends across the trailer. Other types of deployment mechanisms may include a hand operated crank that rotates a take-up bar to roll up the tarp covering. These types of deployment devices are prone to damage because they mount on the exterior of the trailer bed or become cumbersome to operate. Thus, it would be desirable to provide a tarp deployment system for an open top trailer that improves deployment and durability.

SUMMARY OF THE INVENTION

This invention relates to a power actuated top covering system for selectively covering the open top area of a trailer having rigid side walls.

In one embodiment, a cover deployment system includes a flexible cover configured to span an open top of a trailer, the trailer having a front end, a rear end, and longitudinally extending side walls extending therebetween, a plurality of bow assemblies connected to the cover, and a cable system including a pair of cables, an electric actuator, a manual actuator, and a differential. The pair of cables extend longitudinally along the longitudinally extending side walls of the trailer adjacent to the open top. Each of the pair of cables define a loop supported by a pulley at the front end of the trailer and a pulley at the rear end of the trailer. One of the plurality of bow assemblies is fixedly attached to the pair of cables at the front end or the rear end of the open top of the trailer. The remaining bow assemblies of the plurality of bow assemblies are movably attached to the pair of cables. The electric actuator and the manual actuator are operatively connected to the differential, and the differential is positioned between the electric actuator, the manual actuator, and the pulley. The differential is connected to at least one of the pullies and is operative to rotate the pulley to move the cables, thereby moving the cover between a closed position and an open position.

In a second embodiment, a cable attachment bracket includes a first end having a substantially planar sliding surface and a bow mounting groove opposite the planar sliding surface. The bow mounting groove is configured for attachment to a distal end of a bow. A second end has an inboard portion and an outboard portion and is configured for sliding attachment to a cable. A first cable groove is formed on an outwardly facing surface of the inboard portion, and a second cable groove is formed on an inwardly facing surface of the outboard portion. Prior to the attachment of the cable attachment bracket to the cable, the inboard portion and the outboard portion of the second end have a V-shaped traverse section and define an open position.

In a third embodiment, a bow assembly includes a pair of cable attachment brackets, each cable attachment bracket having a first end having a substantially planar sliding surface and a bow mounting groove opposite the planar sliding surface. The bow mounting groove is configured for attachment to a distal end of a bow, and a second end has an inboard portion and an outboard portion and is configured for sliding attachment to the cable. A first cable groove is formed on an outwardly facing surface of the outboard portion, and a second cable groove is formed on an inwardly facing surface of the outboard portion. Prior to attachment of the cable attachment bracket to the cable, the inboard portion and the outboard portion of the second end have a V-shaped traverse section and define an open position. Each distal end of the bow is attached to one of the pair of cable attachment brackets. When the cable is positioned within the first and second cable grooves, and when the inboard portion and the outboard portion of the second end are urged toward each other, the inboard portion and the outboard portion of the second end define a closed position wherein the first and second cable grooves define a cable channel, and the cable is slidably mounted within the cable channel.

Various aspects of this invention will become apparent to those skilled in the art from the following detailed description of the preferred embodiment, when read in light of the accompanying drawings.

DETAILED DESCRIPTION OF THE PREFERRED EMBODIMENT

Throughout this disclosure, various publications, patents, and published patent specifications are referenced by an identifying citation. The disclosures of these publications, patents, and published patent specifications are hereby incorporated by reference into the present disclosure in their entirety to more fully describe the state of the art to which this invention pertains.

The term "chain" herein is used to describe a loop structure in which can be used to operatively connect two pulleys. The term "chain" can include, but is not limited to, a belt, a chain, and a cable.

Figure 1:
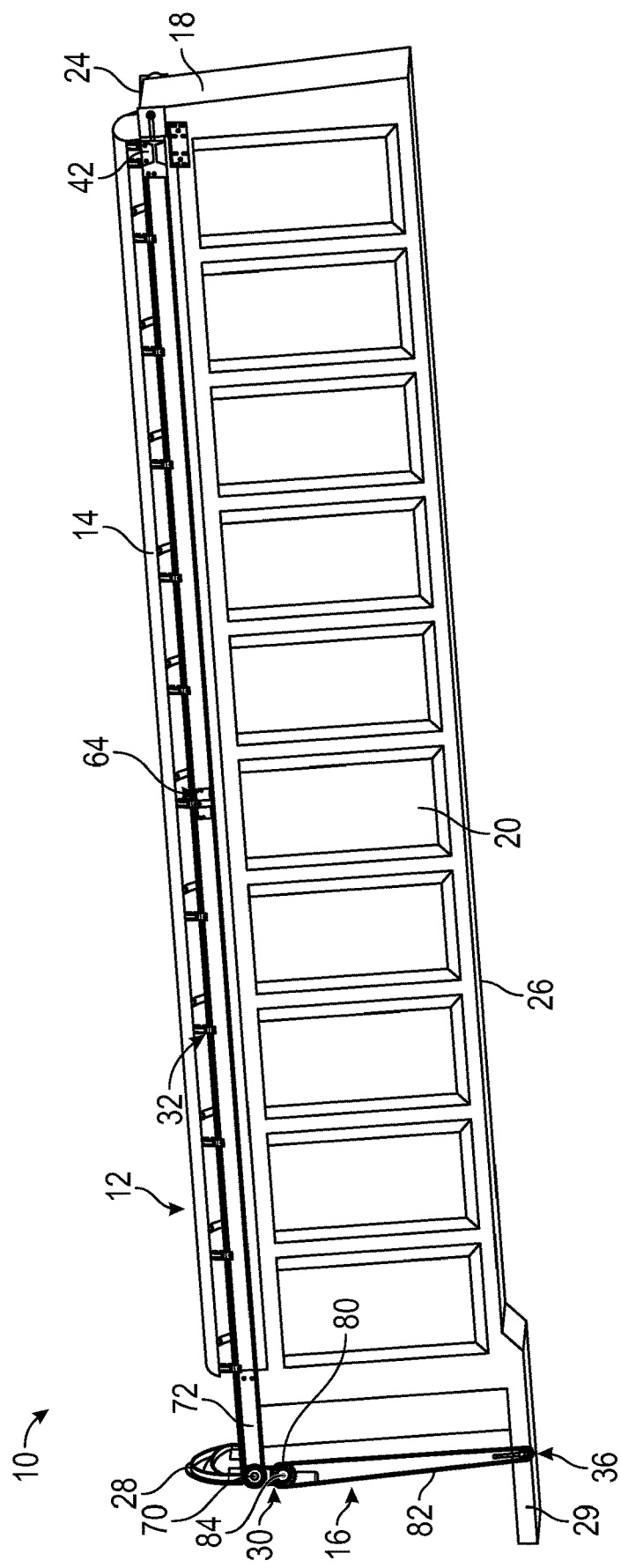
FIG. 1 is a perspective view of a first side of a trailer with a first embodiment of a cover deployment system according to the invention.

Referring now to FIG. 1, a trailer 10 is shown with a first embodiment of a cover deployment system 12 according to the present invention. The cover deployment system 12 is configured to retract and extend a cover 14 over the trailer 10. The illustrated trailer 10 has a front end 16 (the left end when viewing FIG. 1) configured for attachment to a prime mover, such as a tractor (not shown), a rear end 18 (the right end when viewing FIG. 1), a first side 20, a second side 22, best shown in FIG. 2, a top side 24, and a bottom side 26. The trailer 10 may be any type of cargo containment vessel having a generally open top surface, such as a dump bed, box container, grain hauler, and the like. The front end 16 includes a protective plate 28, described below, extending upwardly from the top side 24. Additionally, a ledge 29 extends outwardly from the bottom side 26 of the front end 16.

Figure 17:
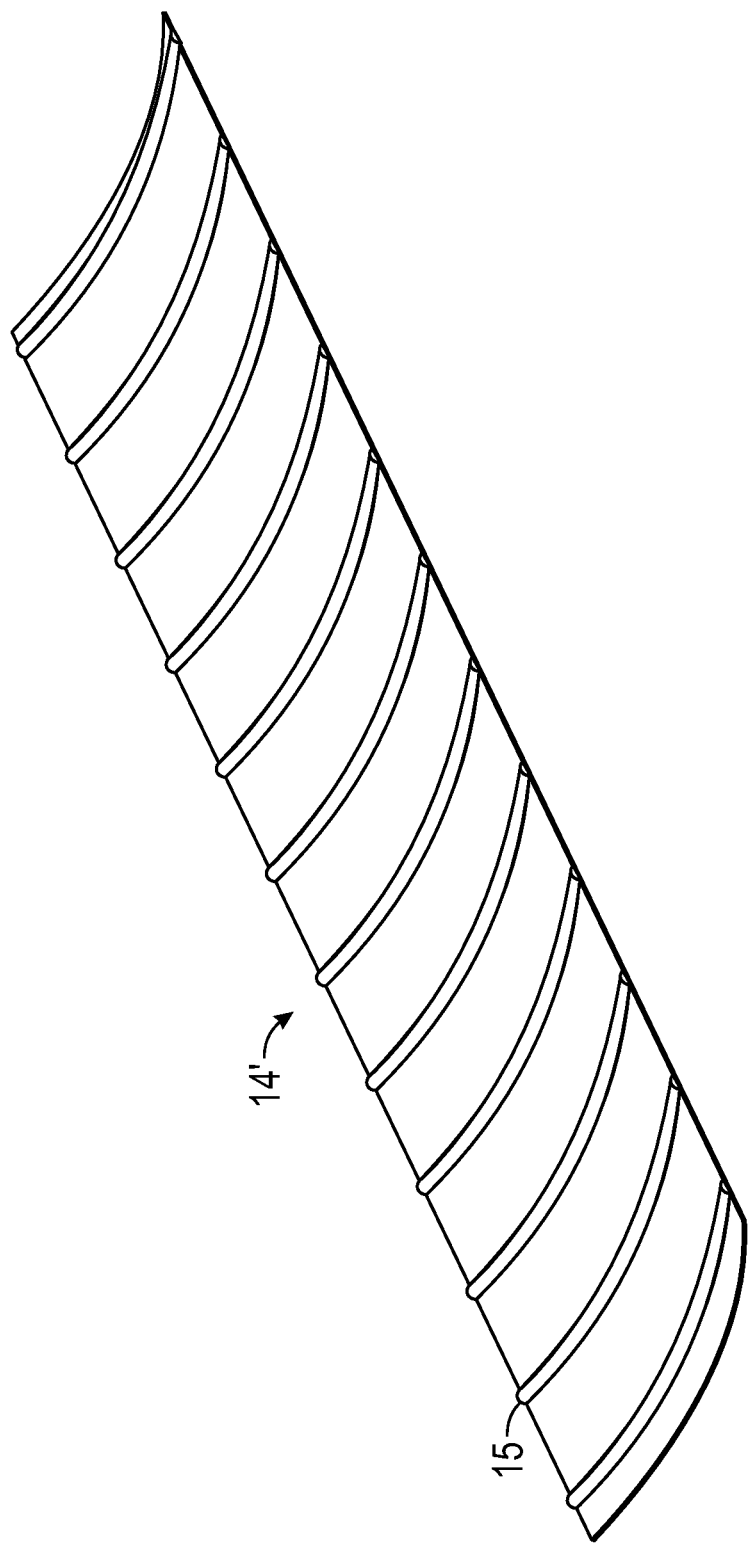
FIG. 17 is a perspective view of an alternate embodiment of the cover including a plurality of pockets.

The cover deployment system 12 includes the cover 14, and also includes a cable system 30, and a plurality of bow assemblies 32. In the figures, the cover 14 is shown as being formed from a soft material, such as plastic, canvas, woven fabric, and other flexible material. Alternatively, the cover 14 may be configured as a hard covering structure, such as a segmented series of metal or polymer panels. An alternate embodiment of the cover 14' is shown in FIG. 17 and includes a plurality of sleeves or pockets 15 into which each bow assembly 32 may be inserted and maintained.

Figure 6:
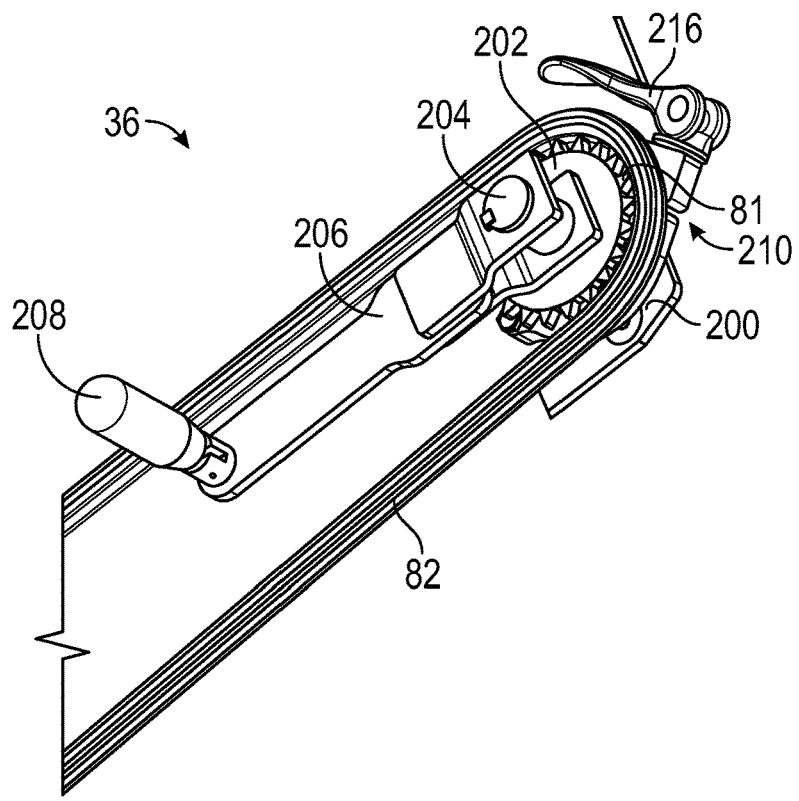
FIG. 6 is a perspective view of a first embodiment of a manual actuator.
Figure 7:
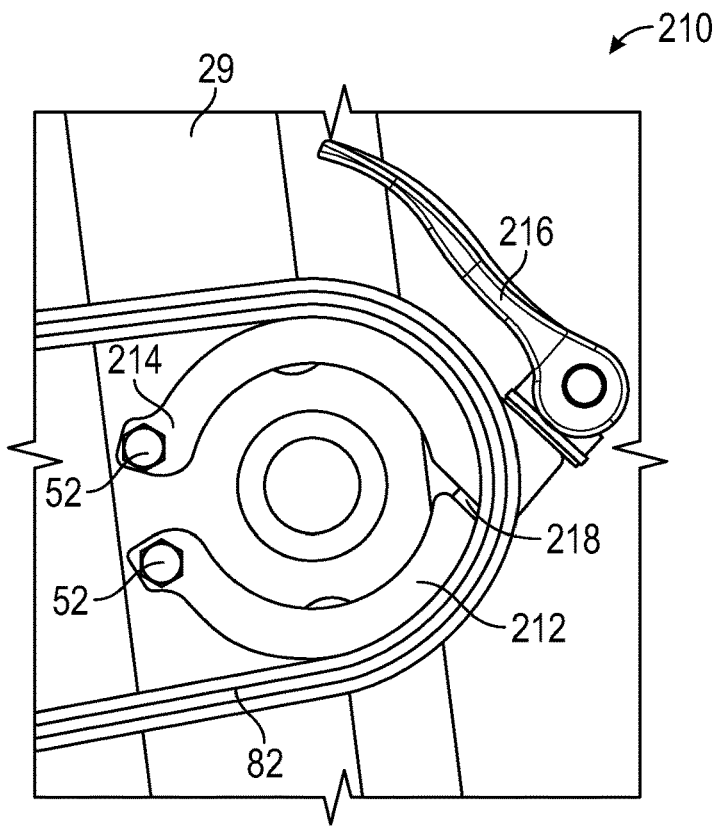
FIG. 7 is perspective view of the first embodiment of the manual actuator illustrated in FIG. 6 with the handle and the fourth sprocket pulley removed.
Figure 8:
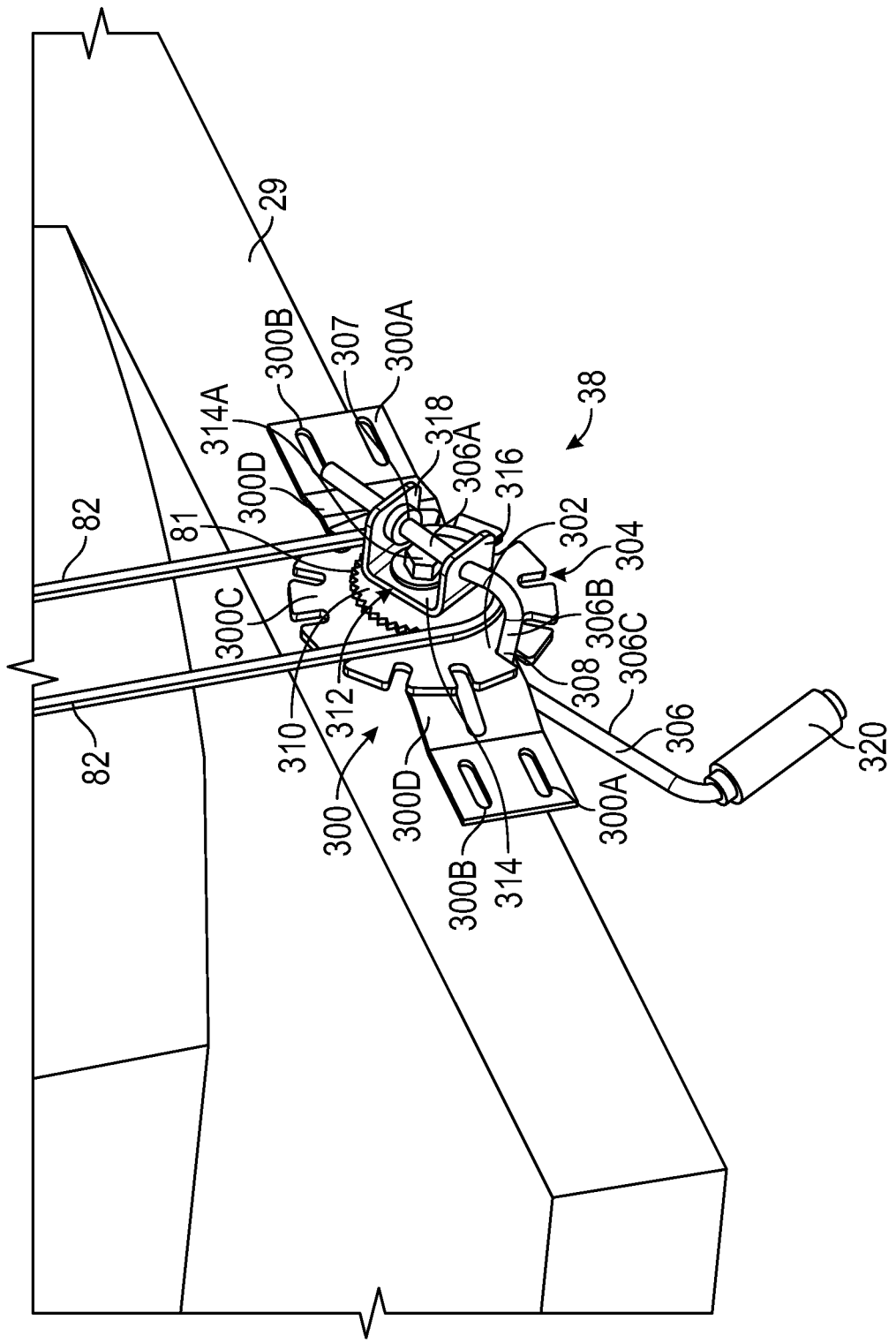
FIG. 8 is a perspective view of a second embodiment of the manual actuator.
Figure 13:
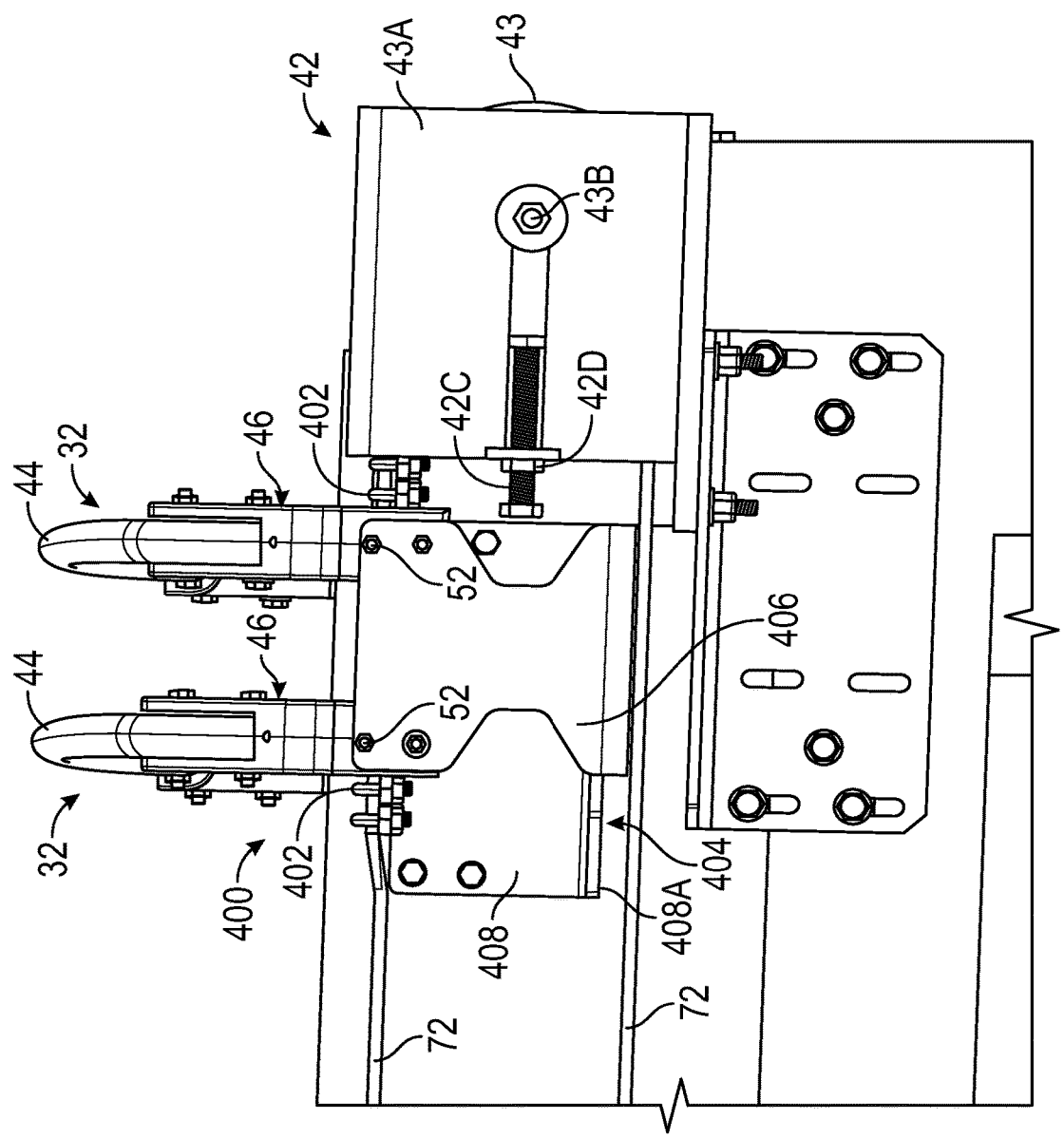
FIG. 13 is an enlarged perspective view of a rear bow assembly attached to the trailer by a rear sliding bracket assembly and a cable tensioner.

The cable system 30 includes an electric actuator 34 consisting of a motor 90, a gearbox 92, and an output shaft 98, a manual actuator, such as the manual actuator 36, best shown in FIG. 6, or the manual actuator 38, shown in FIG. 8, a bar 40, the chains 82 and 88, a first cable 72, a first pulley 70, sprocket pullies 80, 84, 86, and 202 or 310, and may include a cable tensioner 42, best shown in FIG. 13. Each of the sprocket pullies 80, 84, 86, and 202 or 310 can have sprockets 81, best shown in FIGS. 4 and 6-8, configured to move the chain 82 or 88. For example, in the embodiment of the cable system 40 shown in FIG. 1, the first pulley 70 is operatively connected to a tension pulley 43, best shown in FIGS. 13-15, of the cable tensioner 42 by the first cable 72. A first sprocket pulley 80 is operatively connected to the manual actuator 36 by the first chain 82 (see FIG. 1), and a second sprocket pulley 84 is operatively connected to a third sprocket pulley 86 by the second chain 88 (see FIG. 4). These elements of the cable system 30 will be explained in greater detail below.

Figure 9:
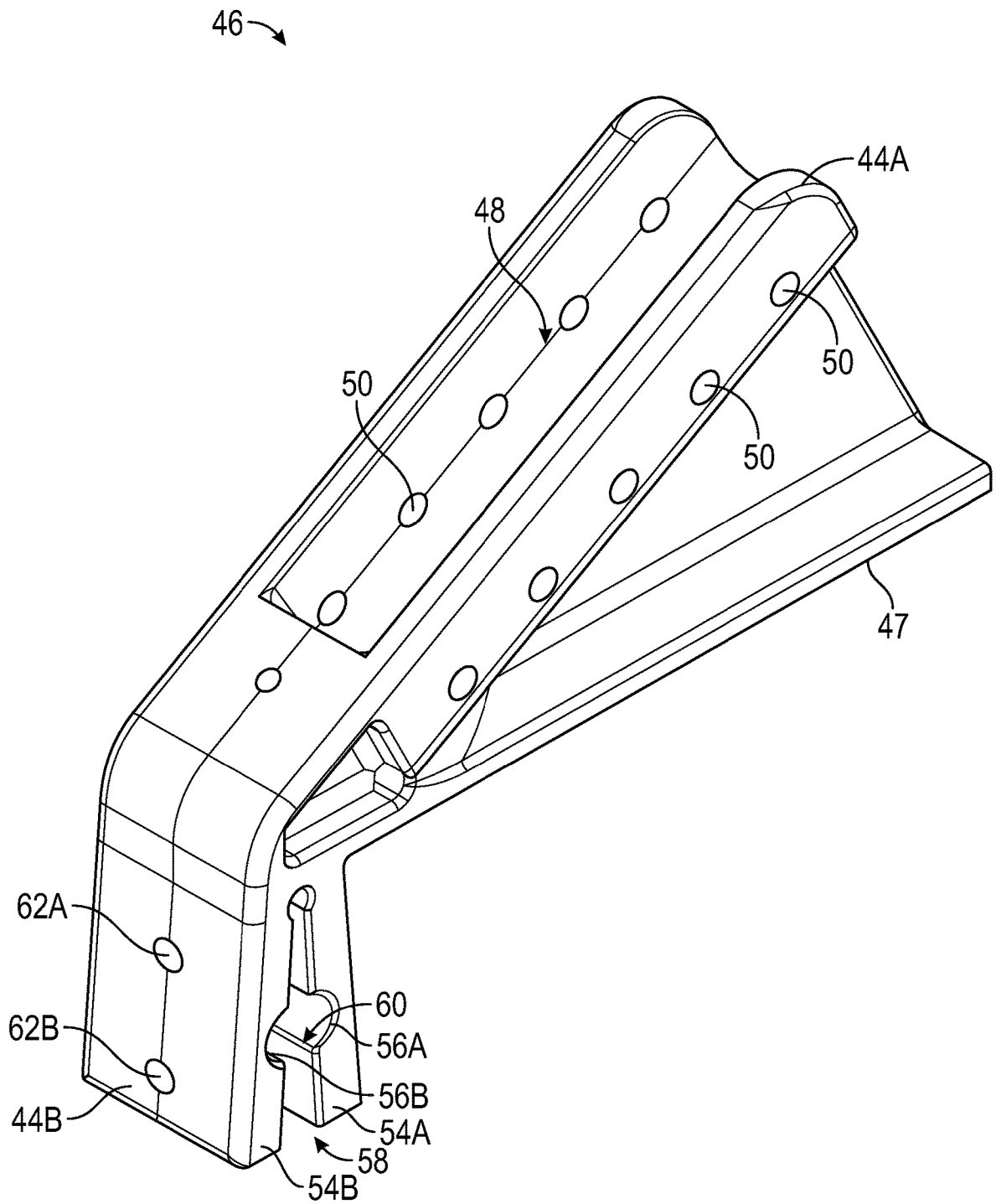
FIG. 9 is a perspective view of a cable attachment bracket.

As best shown in FIGS. 9 through 12, the illustrated bow assemblies 32 include arcuate bows 44, the distal ends of which are attached to cable attachment brackets 46, configured for sliding engagement with the top side 24 of the trailer 10. As best shown in FIG. 9, each cable attachment bracket 46 includes a first end 44A configured for attachment to a distal end of the bow 44 and a second end 44B configured for sliding attachment to one of two longitudinally extending cables 72 and 78, described below.

Figure 11:
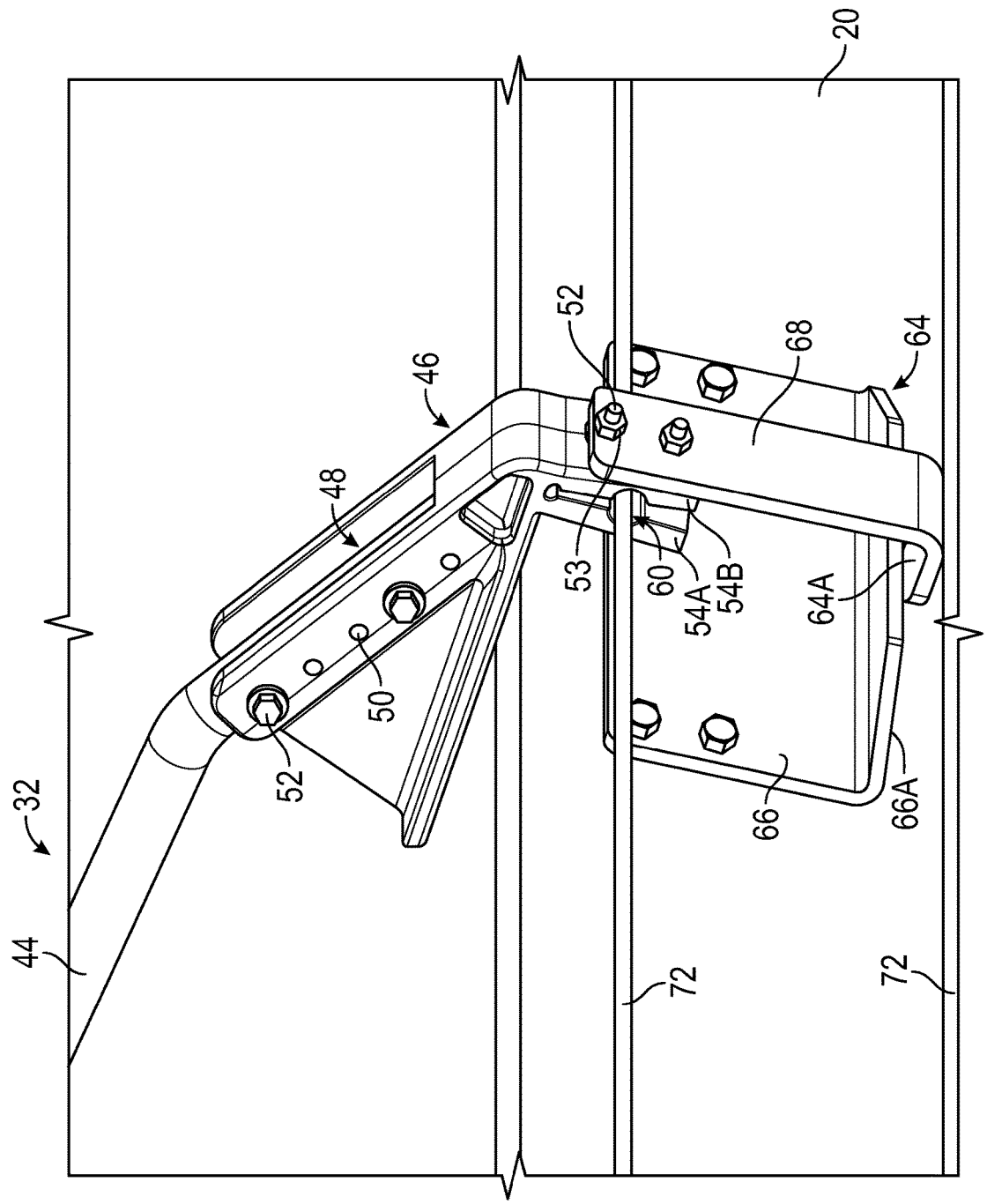
FIG. 11 is a perspective view of the cable attachment bracket attached to the trailer by a sliding bracket assembly.

The first end 44A of the bracket 46 includes a substantially planar sliding surface 47 and a bow mounting groove 48 formed in an outwardly facing surface thereof (the upwardly facing surface when viewing FIG. 9). A plurality of bolt holes 50 are formed through opposing side walls of the bow mounting groove 48. As best shown in FIG. 11, the distal end of the bow 44 is attached within the bow mounting groove 48 by two or more bolts 52.

The second end 44B of the bracket 46 includes a first, inboard portion 54A and a second, outboard portion 54B. A first cable groove 56A is formed on an outwardly facing surface of the inboard portion 54A and a second cable groove 56B is formed on an inwardly facing surface of the outboard portion 54B. Prior to installation, the inboard portion 54A and the outboard portion 54B of the second end 44B have a V-shaped transverse section and define a cable mounting slot 58. When installed, the first cable groove 56A and the second cable groove 56B combine to define a cable channel 60.

Figure 10:
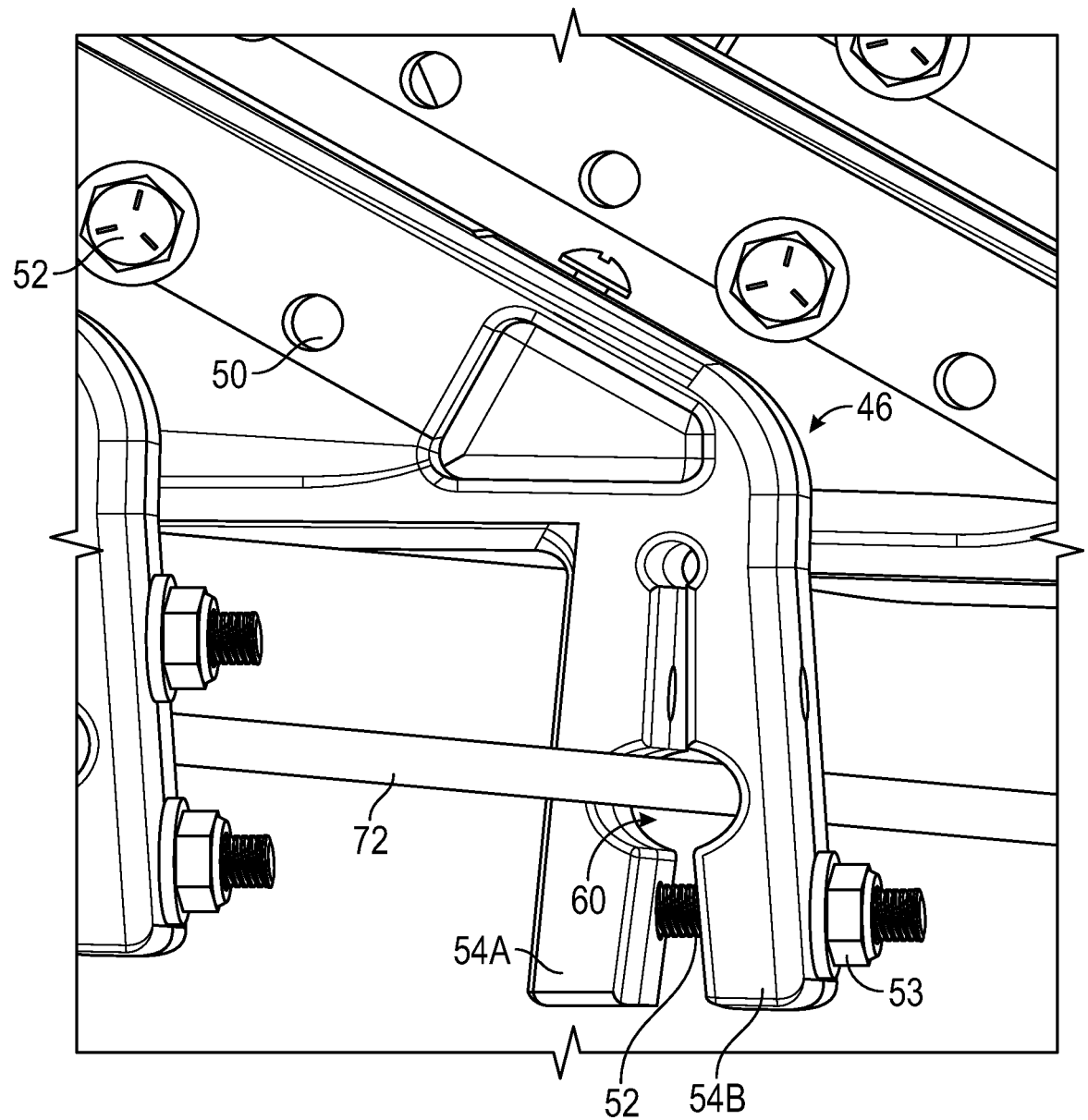
FIG. 10 is a perspective view of the cable attachment bracket illustrated in FIG. 9 shown attached to a first cable.

A first bolt hole 62A is formed through the second end 44B inboard of the cable channel 60, and a second bolt hole 62B is formed through the second end 44B outboard of the cable channel 60. When the second end 44B is installed about one of the two longitudinally extending cables 72 and 78, as shown in FIGS. 10 and 11, bolts 52 and attached nuts 53 may be used to urge the inboard portion 54A and the outboard portion 54B of the second end 44B of the bracket 46 together.

Figure 12:
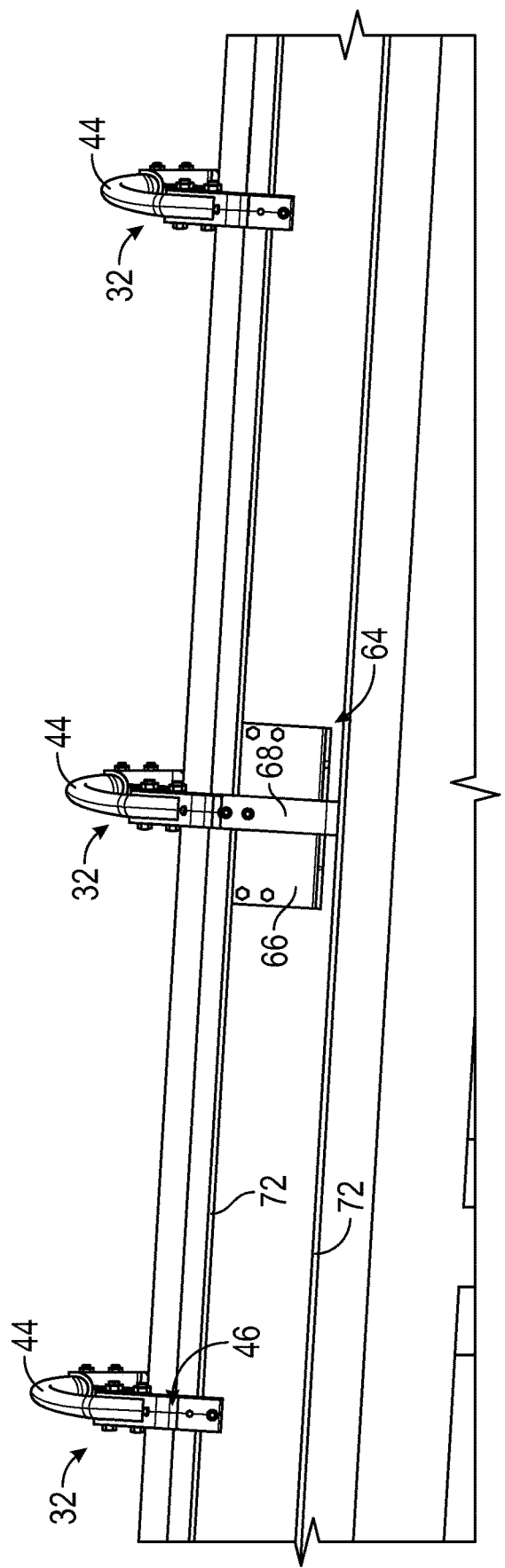
FIG. 12 is an enlarged perspective view of bow assemblies connected to the first cable showing one of the bow assemblies attached to the trailer by the sliding bracket assembly.

As shown in FIGS. 11 and 12, the bow assemblies 32 that are configured for sliding movement are further attached to the trailer 10 by a plurality of spaced apart sliding bracket assemblies 64. Each sliding bracket assembly 64 includes a first bracket portion 66 attached to either the first side 20 or the second side 22 of the trailer 10. Each first bracket portion 66 has an L-shaped transverse section and includes a first planar wall configured for attachment to the trailer 10, and a second planar wall extending outwardly from the trailer 10. The lower surface of the second planar wall (downwardly facing when viewing FIG. 11) defines a first sliding surface 66A.

The sliding bracket assembly 64 also includes an L-shaped second bracket portion 68. A first end of the second bracket portion 68 is attached to the cable attachment bracket 46 via the bolts 52 extending through the first and second bolt holes 62A and 62B, and a second end of the second bracket portion 68 extends inwardly toward the trailer 10. The upper surface of the second end of the second bracket portion 68 (upwardly facing when viewing FIG. 11) defines a second sliding surface 64A, configured for sliding engagement with the first sliding surface 66A. Additionally and advantageously, each cable attachment bracket 46 may be attached to the first cable 72 with only one bolt 52 that extends through the second blot hole 62B.

Figure 14:
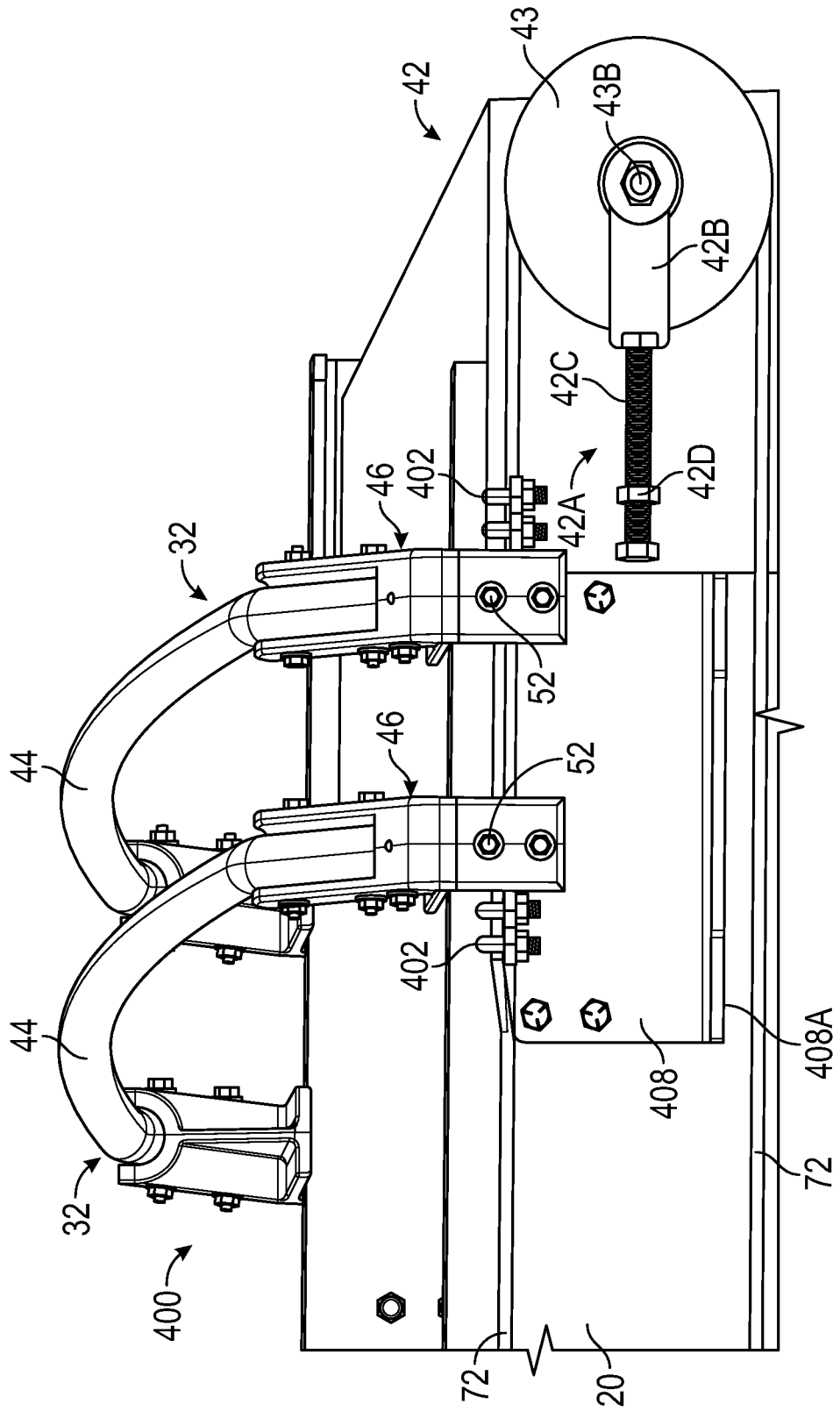
FIG. 14 is an alternate enlarged perspective view of the rear bow assembly illustrated in FIG. 13 showing the rear sliding bracket assembly removed.
Figure 15:
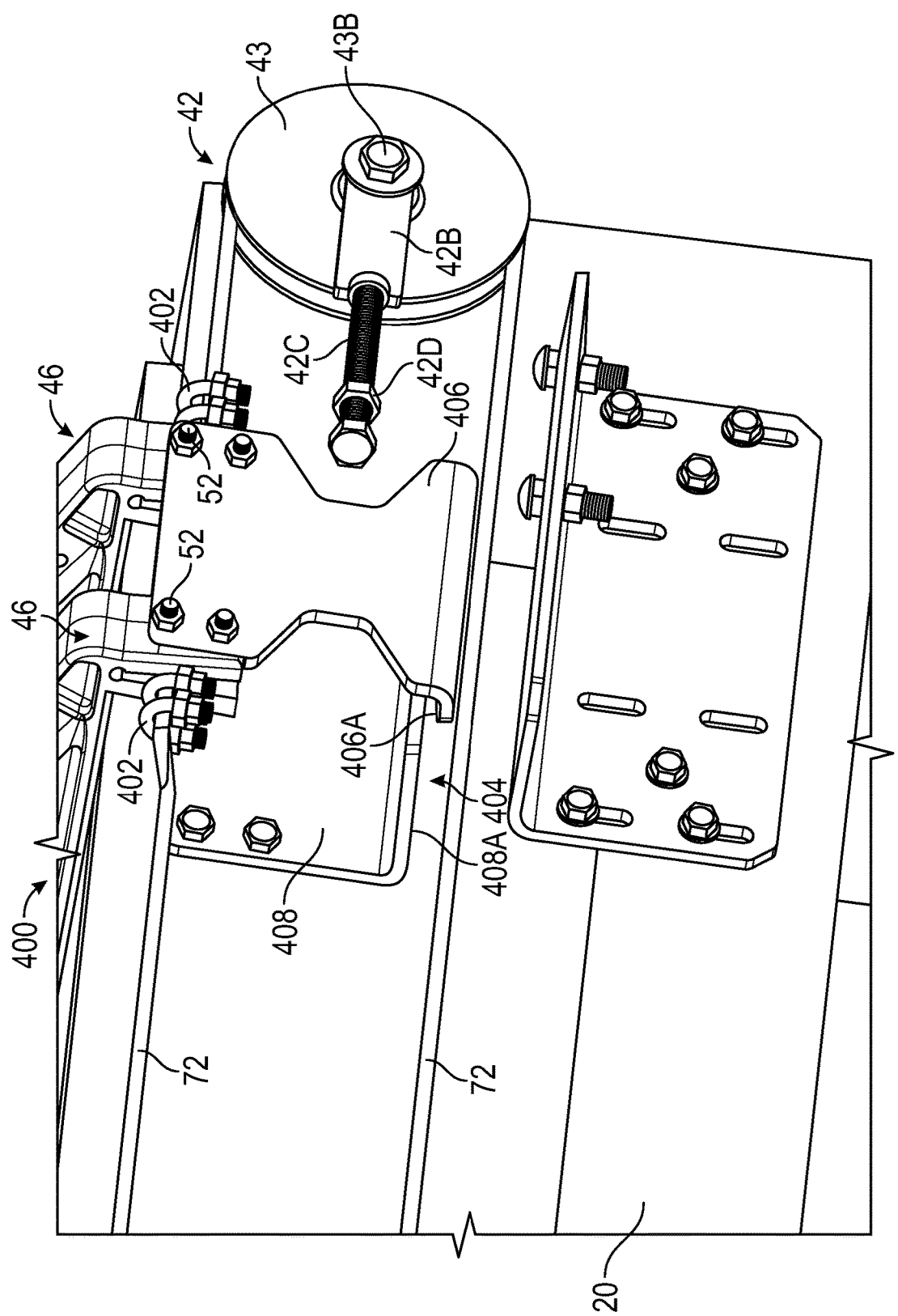
FIG. 15 is a second alternate enlarged perspective view of the rear bow assembly and the cable tensioner with a tension pulley cover removed.
Figure 16:
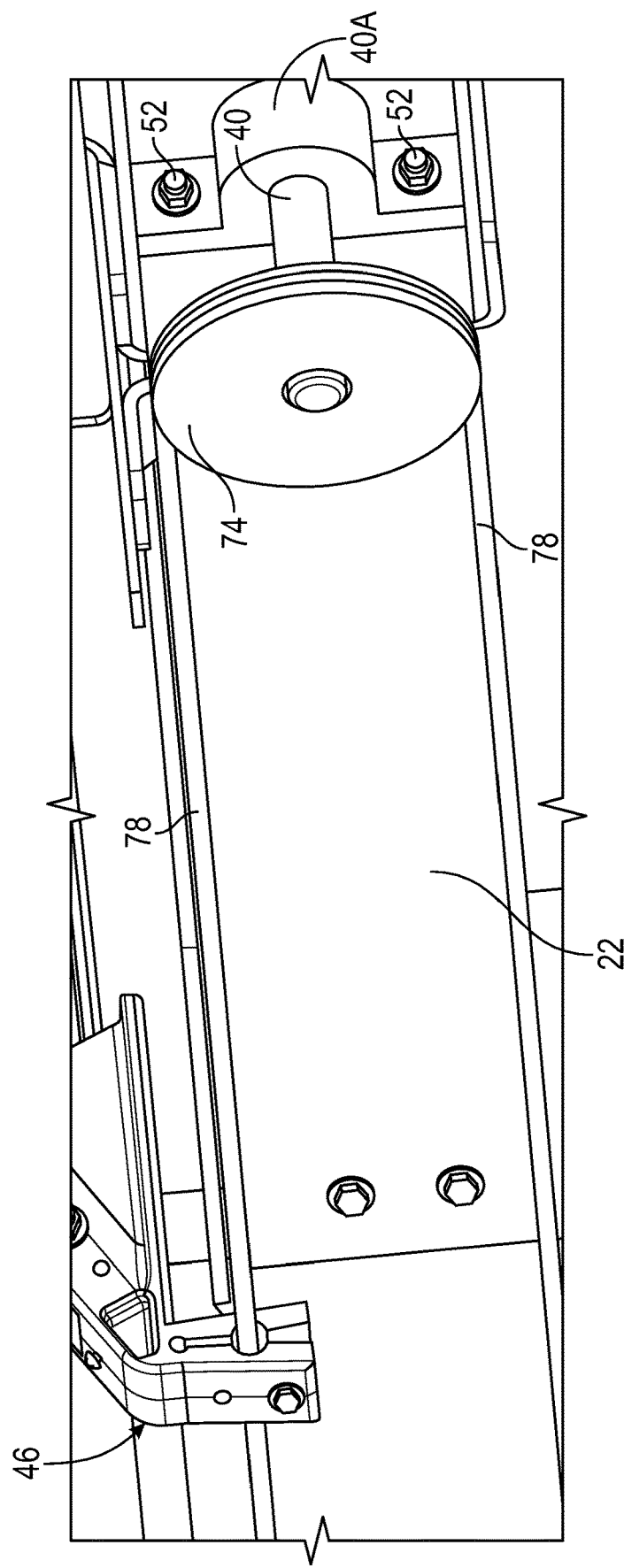
FIG. 16 is an enlarged perspective view of the second side of the trailer showing a second pulley and a second cable.

Referring now to FIGS. 13 through 15, a rear bow assembly 400 is shown. The rear bow assembly 400 uses the previously described bow assemblies 32. The illustrated rear bow assembly 400 includes two bow assemblies 32, however, any number of bow assemblies 32 including, but not limited to, one, two, three, or four may be used. The rear bow assembly 400 may be on the first side 20 and/or the second side 22 of the trailer 10. In the illustrated rear bow assembly 400, the two bow assemblies 32 are locked into position on the first cable 72 by means of locking members 402 on each side of the rear bow assembly 400. The rear bow assembly 400 is attached to the trailer 10 by a rear sliding bracket assembly 404 best shown in FIGS. 13 and 15.

The two bow assemblies 32 are fixedly attached to each other by an L-shaped rear first bracket portion 406. A first end of the rear first bracket portion 406 is attached to the cable attachment brackets 46 via the bolts 52 extending through the first and second bolt holes 62A and 62B of the cable attachment brackets 46, and a second end of the rear first bracket portion 406 extends inwardly toward the trailer 10, defining a first sliding surface 406A.

The rear sliding bracket assembly 404 includes a rear second bracket portion 408 attached the trailer 10. The rear second bracket portion 408 has an L-shaped traverse section and includes a first planar wall configured for attachment to the trailer 10, and a second planar wall extending outwardly from the trailer 10. The lower surface of the second planar wall (downwardly facing when viewing FIG. 15) defines a second sliding surface 408A, configured for sliding engagement with the first sliding surface 406A.

Referring now to FIGS. 13 and 14, the cable tensioner 42 is shown. The illustrated cable tensioner 42 is attached to the first side 20 of the trailer 10 by a fastener 43B, however, the cable tensioner 42 may also be attached to the second side 22, or the cable tensioner 42 may be attached to both the first and second sides 20 and 22. The tension pulley 43 of the cable tensioner 42 is rotatably attached to the first side 20 by the fastener 43B. A tension mechanism 42A is fixedly attached to the tension pulley 43. The tension mechanism 42A has a U-shaped bracket 42B that surrounds a portion of the tension pulley 43 and is fixedly attached by the fastener 43B. A threaded opening is formed on a closed end of the bracket 42B into which a tension bolt 42C is threaded. The tension bolt 42C, when rotated clockwise, is configured to apply a force on the tension pulley 43 to apply tension to the first cable 72. The tension bolt 42C has a tension nut 42D thereon configured to prevent the bolt 42C from unscrewing or rotating counterclockwise. As shown in FIG. 13, the cable tensioner 42 may include a tension pulley cover 43A attached via the fastener 43B and configured to protect the tension pulley 43 from damage, such as from airborne objects.

Figure 18:
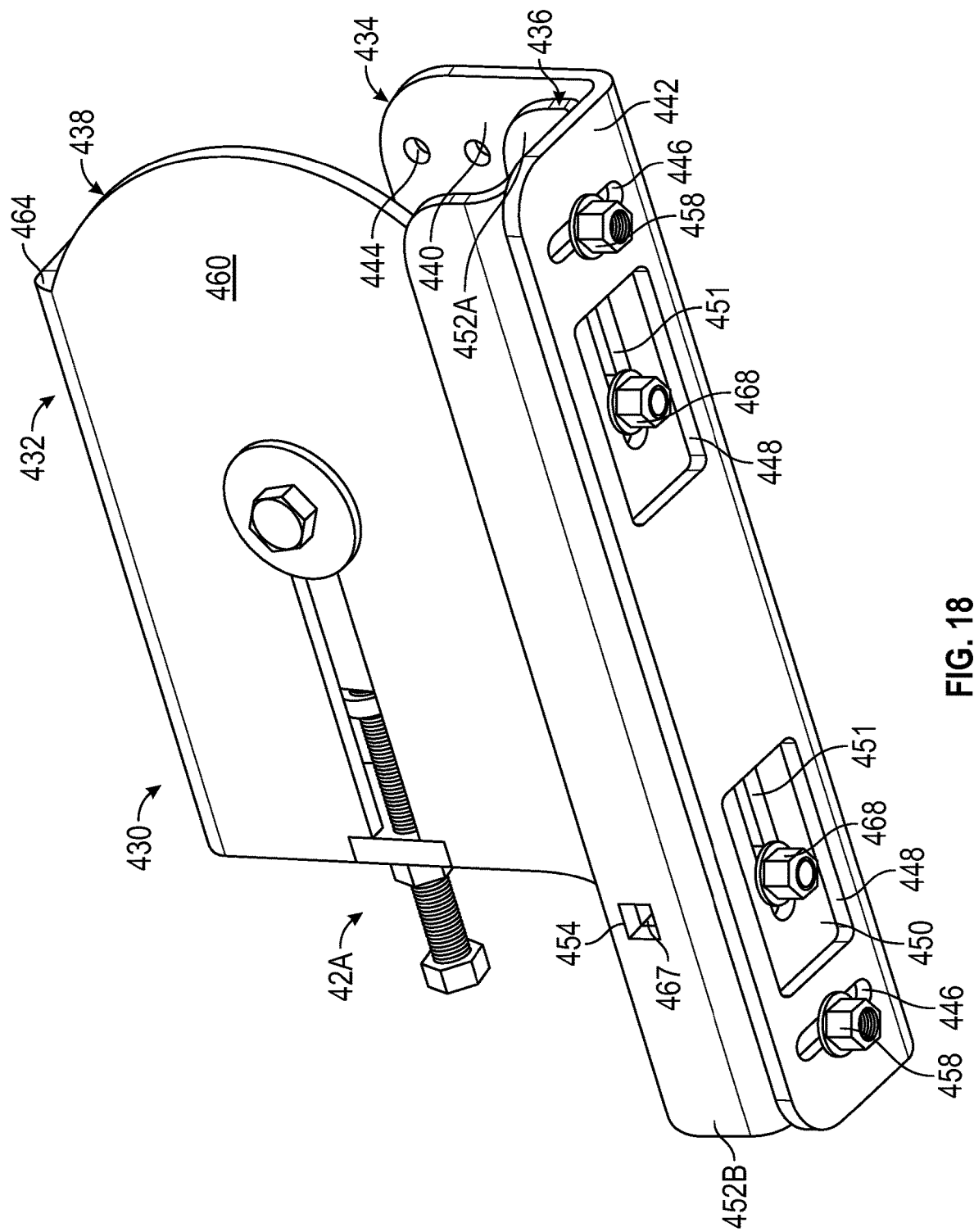
FIG. 18 is a perspective view of an alternate embodiment of the cable tensioner.
Figure 19:
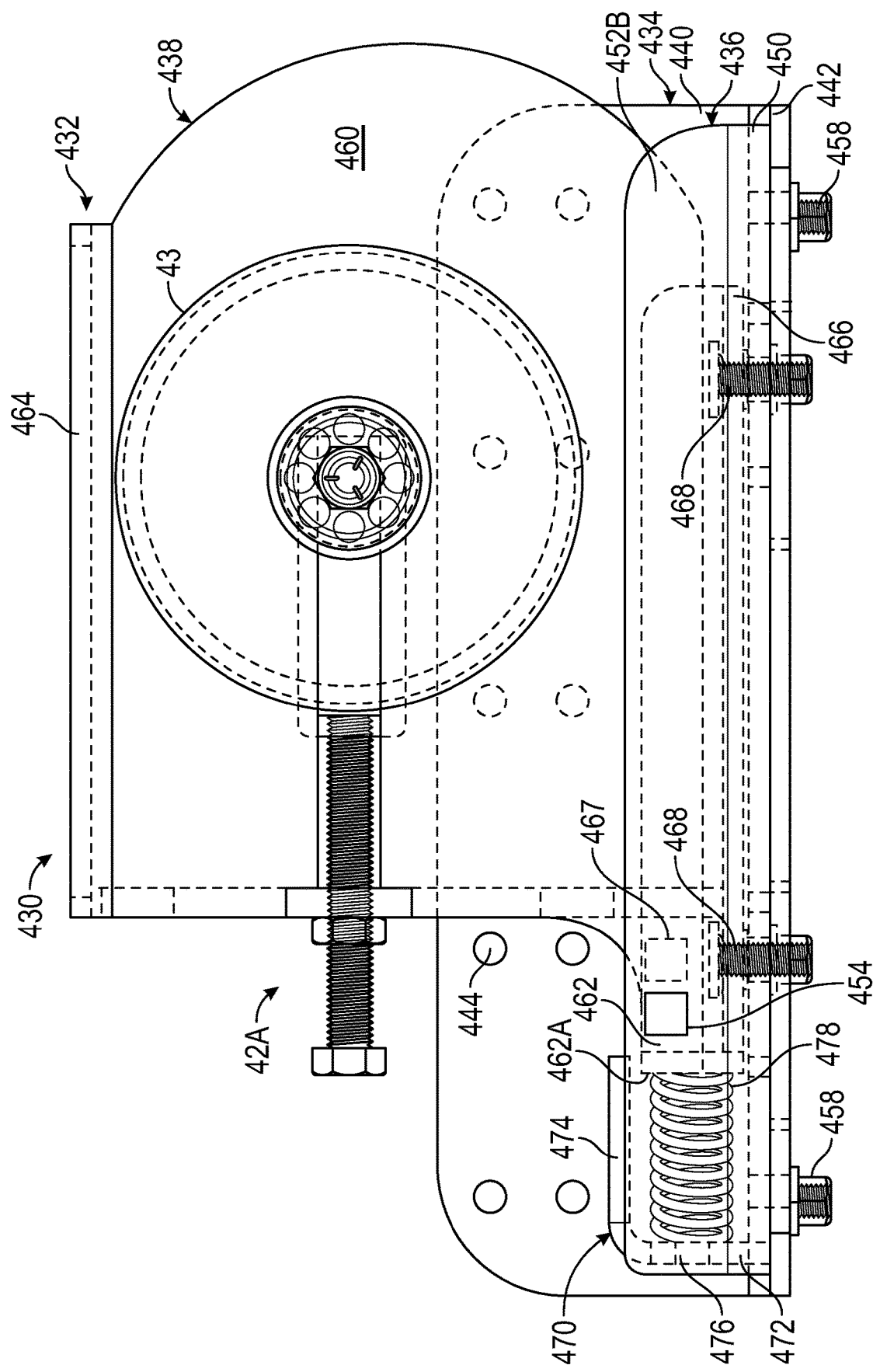
FIG. 19 is a plan view of the cable tensioner illustrated in FIG. 18 show in an untensioned state.
Figure 20:
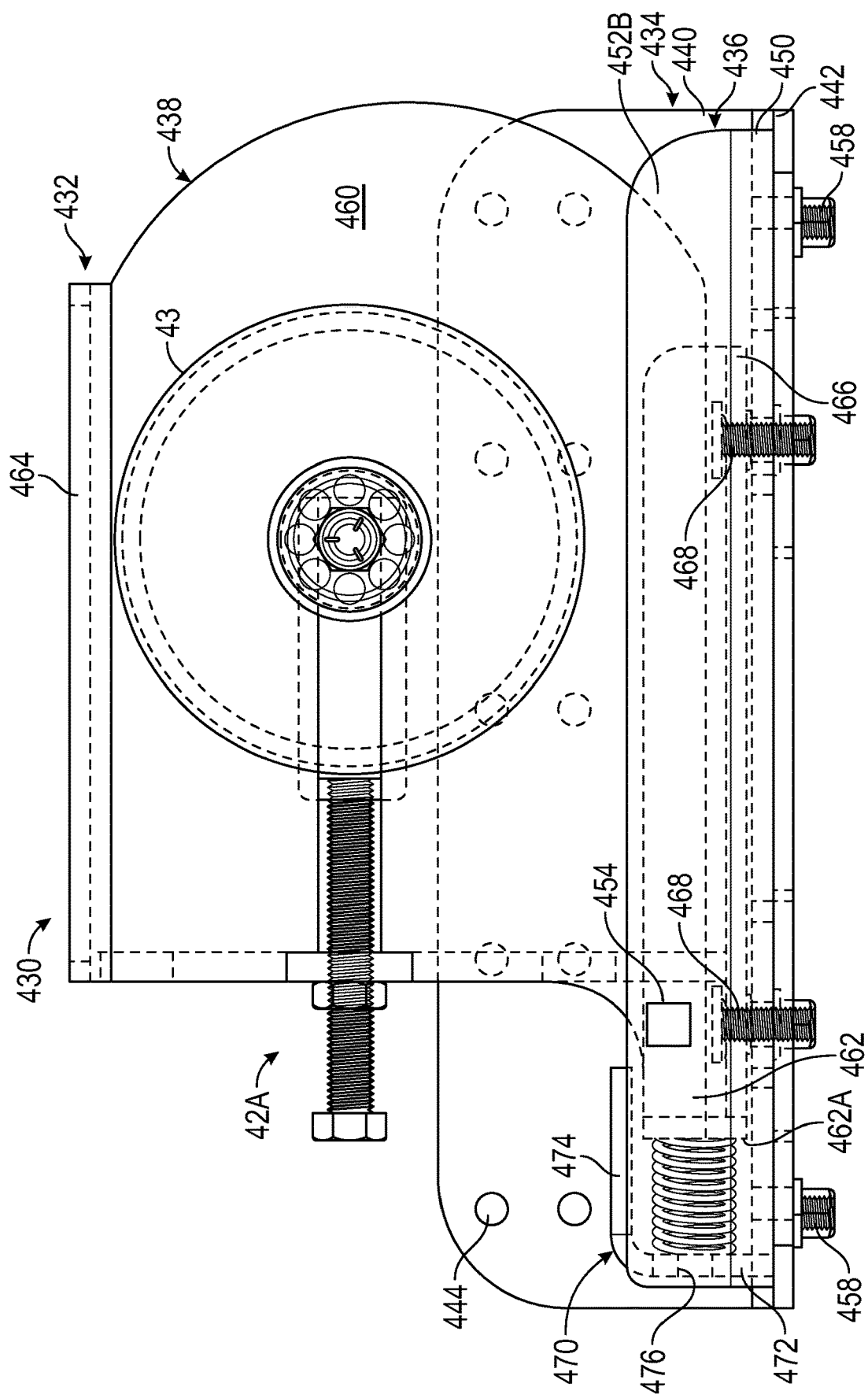
FIG. 20 is an alternate plan view of the cable tensioner illustrated in FIGS. 18 and 19 show in a tensioned state.

Referring now to FIGS. 18 through 20, an alternative embodiment of the cable tensioner is shown at 430. The cable tensioner 430 includes a bracket assembly 432 having a mounting portion 434, as guide portion 436, and pulley cover 438. The mounting portion 434 has a L-shaped transverse section and includes a longitudinally extending first side 440 and longitudinally extending second side 442. The first side 440 is configured to be attached to a side of the trailer 10 by bolts (not shown) via mounting holes 444. The second side 442 includes two traverse slots 446 and two openings 448.

The guide portion 436 has a U-shaped transverse section and includes a longitudinally extending base 450 and two longitudinally extending side walls 452A and 452B. The side wall 452A is positioned adjacent the first side 440 of the mounting portion 434. The side wall 452B includes a first alignment window 454, the purpose for which will be explained below. The base 450 is attached to the second side 442 by fasteners, such as bolts (not shown) and nuts 458 that extend through the slots 446. The base 450 also includes two longitudinally extending slots 451 aligned within the two openings 448. A spring retainer 470 has and L-shaped transverse section and includes a first leg 472 and a second leg 474. The first leg 472 is attached to first end of the guide portion 436 (the left end when viewing FIGS. 19 and 20) and includes a pin hole 476 formed therethrough. A spring mounting pin (not shown) extends through the pin hole 476.

The pulley cover 438 includes a side wall 460 having a forwardly extending spring arm 462 (to the left when viewing FIGS. 19 and 20) having a transversely extending engagement surface 462A. The pulley cover 446 further includes a longitudinally extending first or upper flange 464 and a parallel, longitudinally extending second or lower flange 466. The lower flange 466 is movably mounted to the base 450 by bushings 468 that extend from the lower flange 466, through the slots 451, and into the openings 448. A second alignment window 467 is formed in the side wall 460. A coil spring 478 is positioned between the first leg 472 of the spring retainer 470 and the spring arm 462 and secured in place by the spring mounting pin (not shown). Like the cable tensioner 42, the cable tensioner 430 includes the tension mechanism 42A fixedly attached to the tension pulley 43.

In FIG. 19, the cable tensioner 430 is shown in an untensioned state wherein the spring 478 is not compressed and the first and second alignment windows 454 and 467, respectively, are not aligned.

In FIGS. 18 and 20, the cable tensioner 430 is shown in a tensioned state wherein the spring 478 is compressed and the first and second alignment windows 454 and 467, respectively, are aligned.

Advantageously, the cable tensioner 430 gives an operator a simple and effective means of providing a known tension on the cable, such as the first cable 72. For example, an operator must only adjust the tension mechanism 42A until the pulley cover 446 moves toward the spring 478 (leftward when viewing FIGS. 19 and 20), thus compressing the spring 478. Once the operator observes that the first and second alignment windows 454 and 467 are aligned, the operator will know that the tension on the cable has reached a pre-determined and pre-set value. For example, the illustrated spring 478 may be compressed until a 400 ft-lb tension is achieved in the first cable 72.

In the illustrated embodiments, a 400 ft-lb cable tension has been shown to keep the bows 44 in line and prevent binding of the cover 14 during operation. It will be understood however, that an optimum cable tension will vary based on the size and configuration of the cover 14 and the cover deployment system 12.

Figure 2:
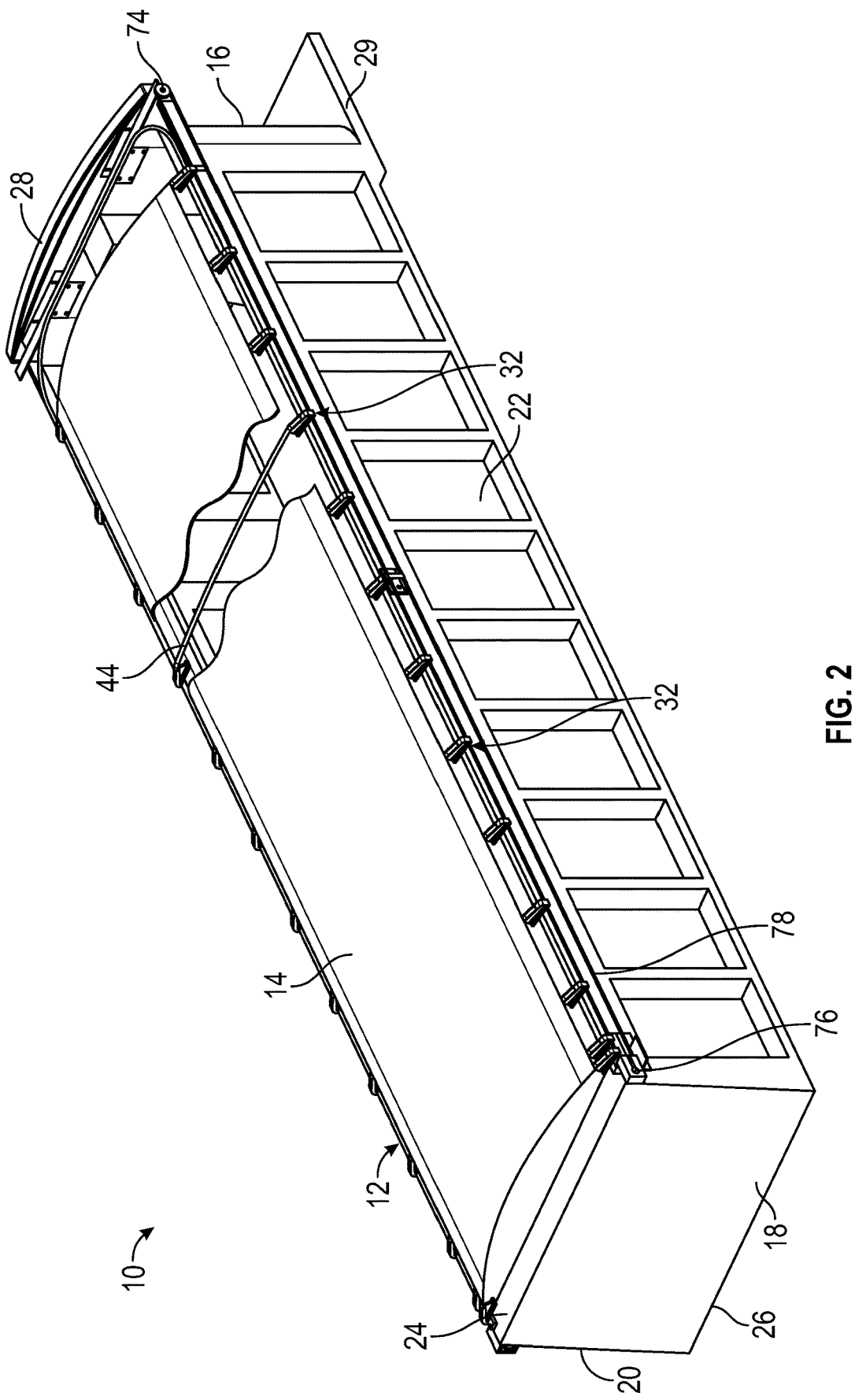
FIG. 2 is an alternate perspective view of the trailer and a portion of the cover deployment system illustrated in FIG. 1 showing a top side and a second side of the trailer with a portion of the cover removed.

FIG. 2 is an alternate view of the trailer 10 and the cover deployment system 12, and shows the top side 24, the second side 22, and the rear end 18 with the cover 14 deployed with a section of the cover 14 removed. FIG. 2 also shows the plurality of bow assemblies 32 that span the top side 24, and a second pulley 74 and a third pulley 76 operatively connected by a second cable 78.

Figure 3:
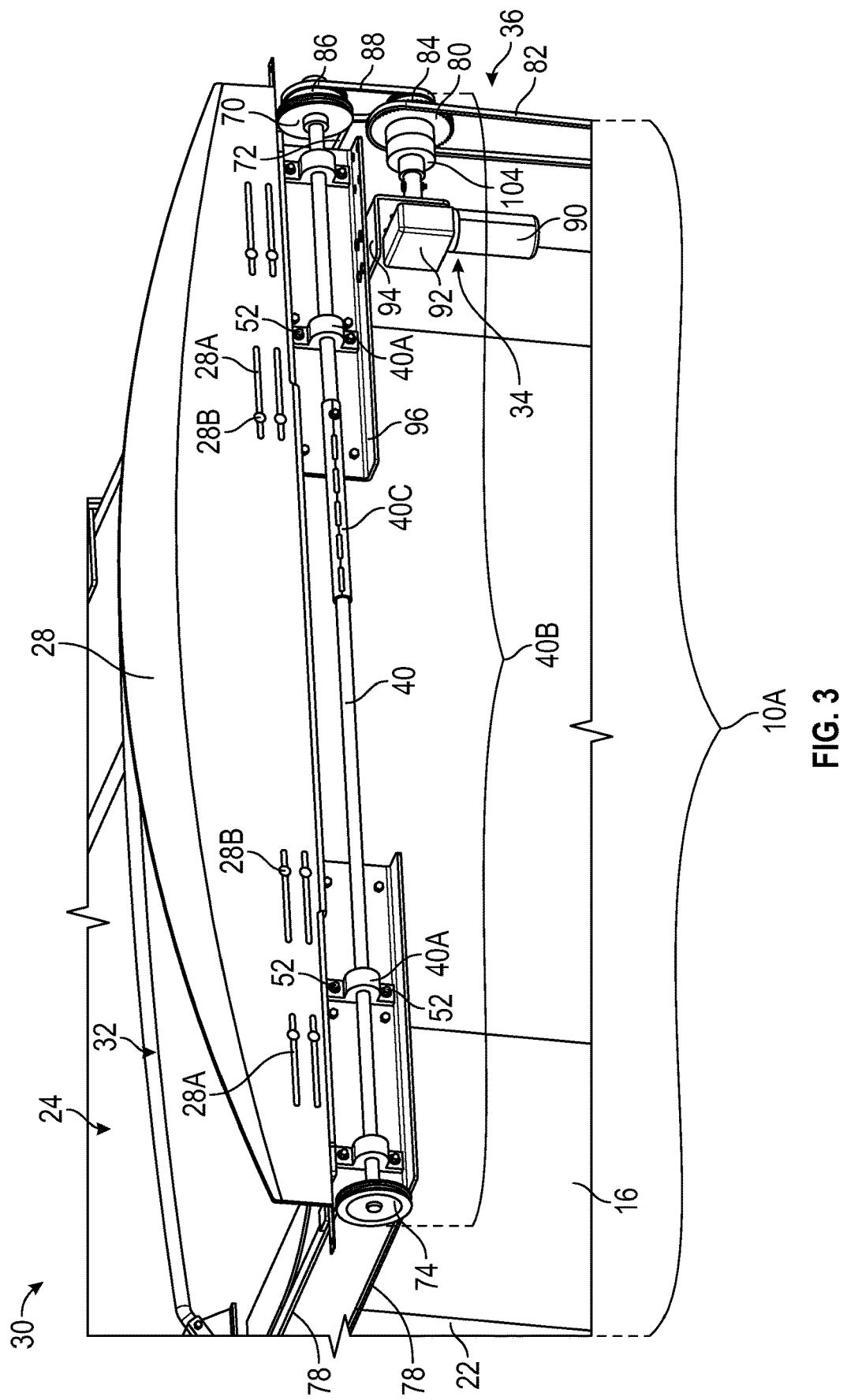
FIG. 3 is a perspective view of a front end of the trailer showing a protective plate and a portion of the cover deployment system illustrated in FIG. 1.

FIG. 3 is an enlarged view of the front end 16 showing the protective plate 28, the bar 40, and the electric actuator 34. The protective plate 28 may be positioned using a series of plate slits 28A and fasteners, such as plate bolts 28B. Alternatively, any desired fastener may be used, such as for example, screws, studs, and the like. The illustrated protective plate 28 may be positioned by loosening the plate bolts 28B, sliding the protective plate 28 to a desired position, and tightening the plate bolts 28B to retain the protective plate 28 in the desired position. Alternatively, any desired means of attachment that allows the protective plate 28 to be selectively moved to, and fixed in, a desired position may be used. Additionally, the protective plate 28 may also be fixedly attached to the trailer 10. The protective plate 28 is configured to protect the cover 14 from airborne hazards when the trailer 10 is in motion, both when the cover 14 is compressed forward, i.e., toward the front end 16, and when the cover 14 is extended, as shown in FIGS. 1 and 2.

Referring again to FIG. 3, the cable system 30 includes the first pulley 70 and the second pulley 74, both fixedly attached to the bar 40. The bar 40 may attached to the trailer with at least one bar holder 40A. The bar holder 40A is secured to the trailer 10 by a plurality of fasteners, such as the bolts 52. In FIG. 3, four bar holders 40A are illustrated, however, any number of bar holders 40A may be provided. The bar 40 may include a generally cylindrical, bar adjustment mechanism 40C disposed around a portion of the bar 40 as shown in FIG. 3. The bar adjustment mechanism 40C is configured to adjust a bar length 40B to accommodate trailers 10 with different trailer widths 10A. The bar length 40B may be adjusted by removing or loosening a fastener from the bar adjustment mechanism 40C, adjusting the length of the bar 40, and replacing or tightening the fastener. The bar adjustment mechanism 40C may be formed from any desired rigid material known including, but not limited to, steel and iron. The bar adjustment mechanism 40C may have any desired shape that does not inhibit the rotation of the bar 40. However, the bar 40 does not need a bar adjustment mechanism 40C to function properly.

Figure 4:
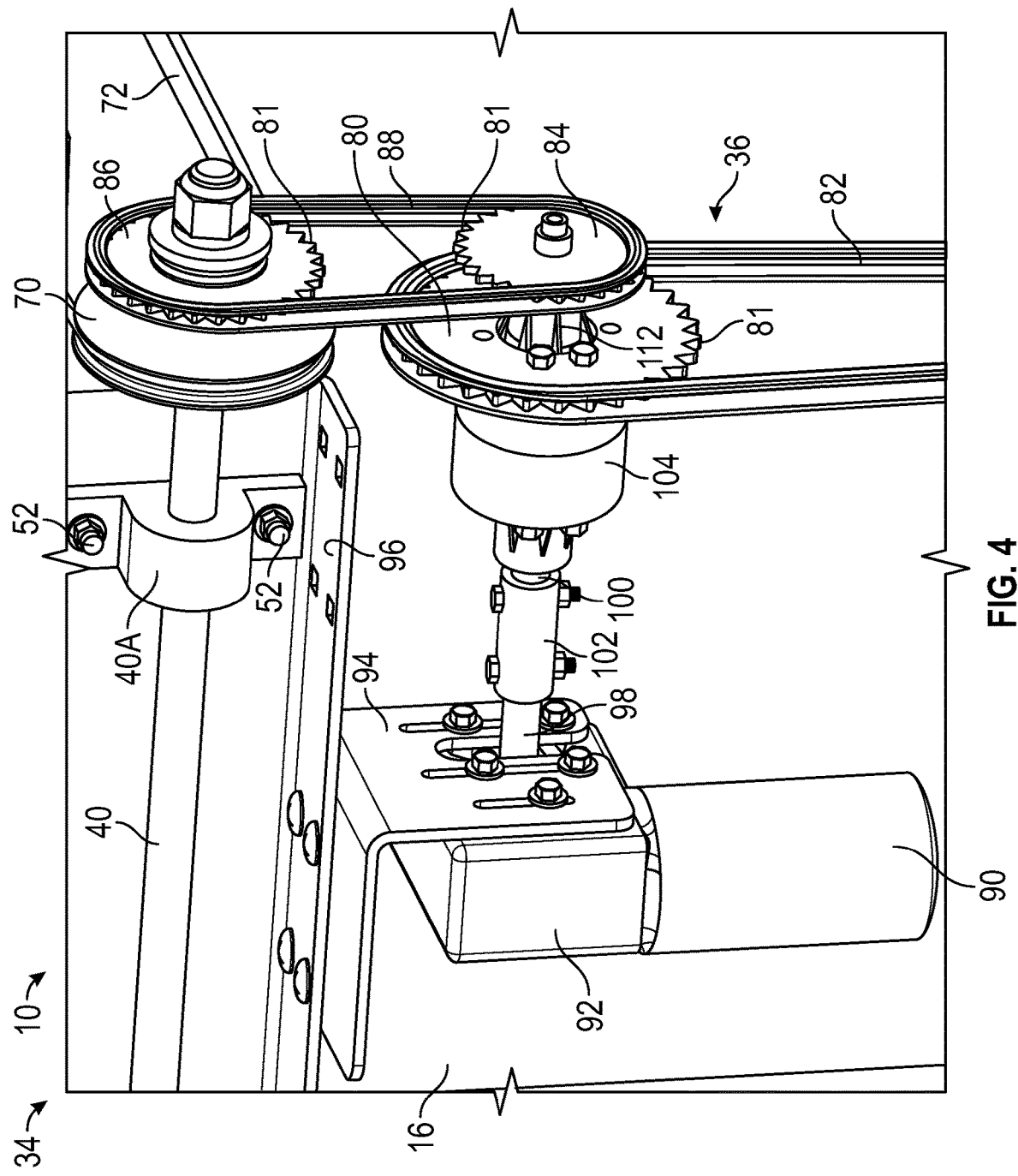
FIG. 4 is an enlarged perspective view of the electric actuator illustrated in FIG. 3.
Figure 5A:
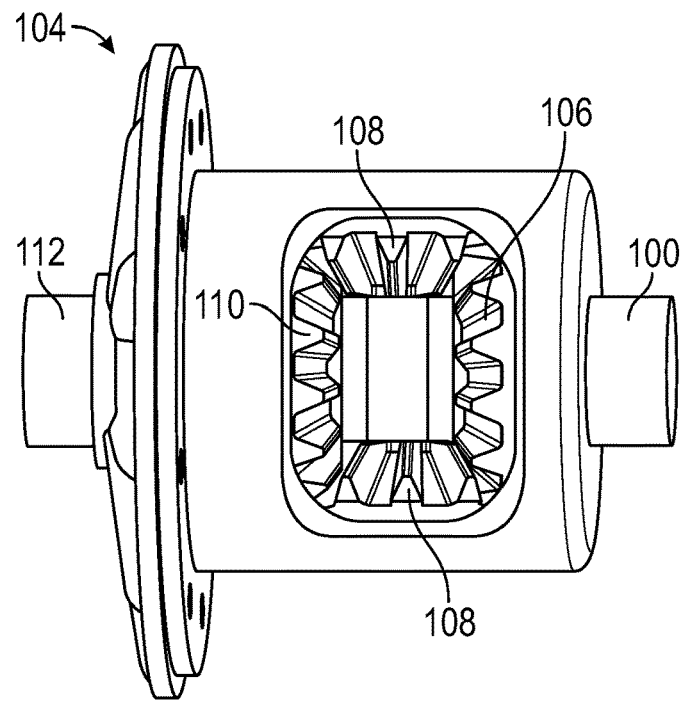
FIG. 5A is a perspective view of an open differential.
Figure 5B:
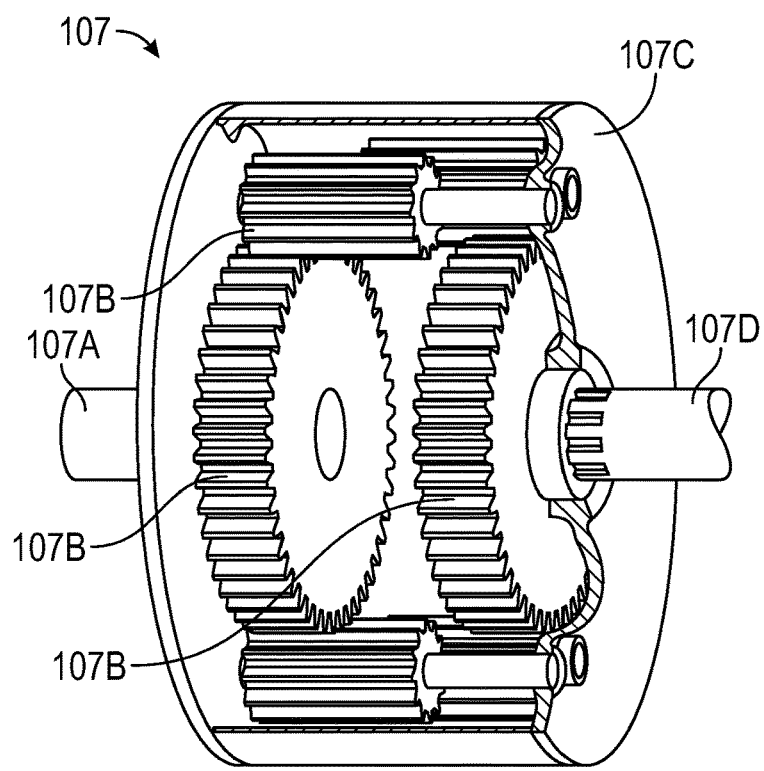
FIG. 5B is a perspective view of a Torsen differential.

Referring now to FIGS. 4, 5A, and 5B, the electric actuator 34 and two possible types of differentials are shown. In the illustrated electric actuator 34, the motor 90 is operatively connected to the gearbox 92 that is fixedly attached to a portion of the trailer 10 using a gearbox bracket 94. The gearbox bracket 94 may be mounted to a gearbox mounting ledge 96 of the trailer 10 by any desired fasteners, such as bolts, rivets, and the like. The output shaft 98 extends from the gearbox 92 and is operatively connected to an input shaft 100 by a coupler 102. The coupler 102 is configured to connect and disconnect the motor 90 and the gearbox 92 from a differential 104.

The differential 104 may be any type of differential such as an open differential, best shown in FIG. 5A, or a Torsen differential 107, best shown in FIG. 5B. As shown in FIG. 4, the differential 104 is an open differential. The input shaft 100 is part of the differential 104 and has a first gear 106 that is engaged with the differential gears 108 and a second gear 110 that is also engaged with the differential gears 108. The second gear 110 has a differential output shaft 112 that is fixedly attached to the second sprocket pulley 84. The first sprocket pulley 80 is fixedly attached to the differential 104 and configured to be operatively attached to the manual actuator 36 or 38. The third sprocket pulley 86 is connected to the bar 40 by a breakaway clutch (not shown) and is operatively connected to the second sprocket pulley 84 by a second chain 88. The breakaway clutch is mounted within, or adjacent to, the third sprocket pulley 86, and is configured to stop movement of the cover 14 via spring washers that will engage the breakaway clutch. Thus, the breakaway clutch is operatively connected between the bar and the third sprocket pulley 86. The breakaway clutch, when engaged, will also reduce stress on the motor 90. In the illustrated embodiments, the breakaway clutch is configured to activate in any overload situation, including obstructions and end of travel limits. For example, depending on the on the size and configuration of the cover deployment system 12, the vehicle to which it is mounted, and the performance characteristics desired by the operator, the breakaway clutch can be set to operate, i.e., to release, within the range of from about 0 in-lbs to about 3,000 in-lbs of torque.

The Torsen Differential 107 illustrated in FIG. 5B is conventional in the art and has a first shaft 107A that is operatively attached to a series of gears 107B contained within a housing 107C. The gears 107B rotate due to rotational torque provided by the first shaft 107A. The series of gears 107B are also operatively attached to a second shaft 107D that is configured to transfer torque to the second sprocket pulley 84.

Referring now to FIGS. 6 and 7, the first embodiment of the manual actuator 36 is shown. The fourth sprocket pulley 202 is rotatably attached to the ledge 29 by a bracket 200. The fourth sprocket pulley 202 and the first sprocket pulley 80, best shown in FIG. 4, are operatively connected by the first chain 82. The manual actuator 36 is attached to the ledge of the trailer 10 by a crank retention pin 204 that extends outwardly from the ledge 29 and through the fourth sprocket pulley 202. A crank 206 is fixedly attached to the crank retention pin 204 and may extend generally perpendicularly from a longitudinally extending axis of the crank retention pin 204. A crank handle 208 extends outwardly (generally perpendicularly from the crank 206 when viewing FIG. 6) from a distal end of the crank 206 for user operation.

A crank lock 210 is positioned between the fourth sprocket pulley 202 and the ledge 29. The crank lock 210 has a first, generally C-shaped, brake member 212 and a second, generally C-shaped, brake member 214 that are fixedly attached to the ledge 29 by bolts 52 at a point distal from a crank lock handle 216. The first brake member 212 and the second brake member 214 are operatively connected to the crank lock handle 216 by a screw 218 that extends between the first brake member 212 and the second brake member 214.

The bolts 52 function to secure the first brake member 212 and the second brake member 214 in position, but also allow the brake members 212 and 214 to be adjusted closer together at a point distal from the bolts 52. This adjustment may be achieved by rotating the crank lock handle 216 to adjust the length of a portion of the brake screw 218. The length of the portion of the brake screw 218 indicates how close the first brake member 212 is to the second brake member 214. When the brake members 212 and 214 are adjusted to be close together, a forced is applied to the fourth sprocket pulley 202, which prevents the fourth sprocket pulley 202 from rotating. Thus, when the brake members 212 and 214 are adjusted closer together the manual actuator 36 is in a locked position. However, when the brake members 212 and 214 are adjusted to be further apart, the manual actuator 36 is in an unlocked position.

Referring now to FIG. 8, the second embodiment of the manual actuator 38 is shown. The manual actuator 38 includes a crank mount 300 configured for attachment to the ledge 29 of the trailer 10. The crank mount 300 includes two co-planar mounting flanges 300A extending outwardly from an intermediate portion 300C and defining distal ends thereof. The flanges 300A have mounting apertures 300B formed therethrough. The crank mount 300 may be attached to the ledge 29 of the trailer 10 by one or more fasteners (not shown) that extend through the mounting apertures 300B.

The intermediate portion 300C has a generally circular shape, has a plurality of radially extending crank slots 304 formed in a peripheral edge thereof, and is connected to the flanges 300A via connecting portions 300D. The connecting portions 300D extend outwardly from the flanges 300A such that a plane of the intermediate portion 300C is spaced a distance apart from the ledge 29 when the crank mount 300 is mounted to the trailer 10. A second embodiment of the fourth sprocket pulley 310 is rotatably attached to the intermediate portion 300C of the crank mount 300. The fourth sprocket pulley 310 is operatively connected to the first sprocket pulley 80, best shown in FIG. 4, by the first chain 82.

A crank bracket 312 includes a base 314 having a first wing 316 and a second wing 318 extending outwardly therefrom. The crank bracket 312 is fixedly attached to the crank mount 300 by a bolt 314A. The wings 316 and 318 have holes therethrough through which a crank 306 may extend. The illustrated crank 306 includes a first portion 306A, a second portion 306B, extending at about a 90-degree angle from the first portion 306A, and a third portion 306C, extending at about a 90-degree angle from the second portion 306B. An elbow 308 is defined at the bend between the second portion 306B and the third portion 306C. A handle 320 extends at about a 90-degree angle from the third portion 306C and is configured for user operation of the manual actuator 38. The first portion 306A may be retained within the wing 318 by a fastener 307.

The second portion 306B of the crank 306 near the elbow 308 is configured to be seated within one of the radially extending crank slots 304, and to be moved as desired to any of the plurality of radially extending crank slots 304. Thus, the manual actuator 38 is configured to be moved between a desired one of a plurality of locked positions, wherein the second portion 306B of the crank 306 is secured within one of the crank slots 304 and an unlocked position wherein the second portion 306B of the crank 306 is not seated or secured within one of the radially extending crank slots 304.

In operation, the cover deployment system 12 may use a control panel (not shown), which may be cab-mounted, to activate the motor 90. The motor 90 provides rotary torque to the gearbox 92 which in turn reduces speed and increases the torque that is applied to the output shaft 98. The output shaft 98 then provides torque through the differential 104 causing the second sprocket pulley to rotate 84. When the second sprocket pulley 84 rotates, it moves the second chain 88 and causing the third sprocket pulley 86 rotate. The third sprocket pulley 86 then rotates the bar 40 which in turn rotates the first pulley 70 and the second pulley 74. When the first pulley 70 and the second pulley rotate 74, the first cable 72 and the second cable 78 move, respectively. The cables 72 and 78 then move the rear bow assembly 400 along the cables 72 and 78 extending or retracting the cover 14. The cover 14 is configured such that when the cover 14 retracts towards the front end 16 of the trailer 10, the cover material folds like an accordion. When the cover 14 extends or retracts, the pockets 15 in the cover 14 slide the remaining bow assemblies 32 along the sliding bracket assemblies 64.

If manual actuation is desired, the manual actuator 36 or 38 may be operated by rotating the crank 206 or 306 which rotates the fourth sprocket pulley 202 or 310. The fourth sprocket pulley 202 or 310 then moves the first chain 82, which rotates the first sprocket pulley 80. When the first sprocket pulley rotates 80, the differential 104 rotates. The differential 104 rotation causes the differential output shaft 112 rotate and further causes the second sprocket pulley 84 rotate. When the second sprocket pulley 84 rotates, it moves the second chain 88. This causes the third sprocket pulley 86 rotate. The third sprocket pulley 86 then rotates the bar 40 which in turn rotates the first pulley 70 and the second pulley 74. When the first pulley 70 and the second pulley 74 rotate, the first cable 72 and the second cable 78 move, respectively. The cables 72 and 78 then move the rear bow assembly 400 along the cables 72 and 78 extending or retracting the cover 14. The cover 14 is configured such that when the cover 14 retracts towards the front end 16 of the trailer 10, the cover material folds like an accordion. When the cover 14 extends or retracts, the pockets 15 in the cover 14 slide the remaining bow assemblies along the sliding bracket assemblies 64.

Although the cover deployment system 12 disclosed herein has been described as being used on a trailer with an open top, it will be understood that the various embodiments of the cover deployment system 12 may be used with covers for any desired container or structure having an open or closed top.

The principle and mode of operation of this invention have been explained and illustrated in its preferred embodiment. However, it must be understood that this invention may be practiced otherwise than as specifically explained and illustrated without departing from its spirit or scope.

What is claimed is:
1. A cover deployment system comprising:
a flexible cover configured to span an open top of a trailer, the trailer having a front end, a rear end, and longitudinally extending side walls extending therebetween;
a plurality of bow assemblies connected to the cover; and
a cable system including a pair of cables, an electric actuator, a manual actuator, and a differential;
wherein the pair of cables extend longitudinally along the longitudinally extending side walls of the trailer adjacent the open top, each of the pair of cables defining a loop supported by a pair of pullies, each pair of pullies having a first pulley at the front end of the trailer and a second pulley at the rear end of the trailer;
wherein one of the plurality of bow assemblies is fixedly attached to the pair of cables at one of the front end and the rear end of the open top of the trailer;
wherein the remaining bow assemblies of the plurality of bow assemblies are movably attached to the pair of cables;
wherein the electric actuator and the manual actuator are operatively connected to the differential, the differential positioned between the electric actuator, the manual actuator, and one of the first pullies; and
wherein the differential is connected to at least one of the first pullies and is operative to rotate the connected one of the first pullies to move the pair of cables, thereby moving the cover between a closed position and an open position.

2. The cover deployment system of claim 1, wherein the electric actuator and the manual actuator are configured to work independently of each other, such that the cover deployment system is movable between a first operating position wherein the cover is moved by the electric actuator, and a second operating position wherein the cover is moved by the manual actuator.

3. The cover deployment system of claim 1, wherein the differential is a limited slip differential.

4. The cover deployment system of claim 1, wherein the differential is a Torsen differential.

5. The cover deployment system of claim 1, wherein the electric actuator comprises a motor, a gearbox, and an output shaft.

6. The cover deployment system of claim 5, wherein the output shaft is connected to the differential by a coupler that connects a portion of the output shaft to an input shaft of the differential.

7. The cover deployment system of claim 1, wherein the cover includes a pocket configured to receive and maintain one of the pluralities of bow assemblies.

8. The cover deployment system of claim 1, wherein the manual actuator includes a fourth sprocket pulley and wherein a first sprocket pulley is attached to the differential.

9. The cover deployment system of claim 8, wherein the differential and the manual actuator are operatively connected by a first chain that defines a loop that is supported by the fourth sprocket pulley and the first sprocket pulley; and
wherein sprockets on the first sprocket pulley and the fourth sprocket pulley are configured to move the chain.

10. The cover deployment system of claim 1, wherein the differential has a differential output shaft fixedly attached to a second sprocket pulley;
wherein the second sprocket pulley is operatively attached to a third sprocket pulley by a second chain that defines a loop in which the second chain is configured to rotate the third sprocket pulley;
wherein the third sprocket pulley is connected to a bar by a breakaway clutch configured to reduce stress on a motor of the electric actuator when the motor is engaged; and
wherein the at least one of the pullies is fixedly attached to the bar.

11. The cover deployment system of claim 1, wherein at least one of second pullies at the rear end of the trailer is a tension pulley configured to apply tension to one of the pair of cables.

12. The cover deployment system of claim 1, further comprising a sliding bracket assembly.

13. The cover deployment system of claim 12, wherein the sliding bracket assembly includes a first bracket portion attached to a side of the trailer and a second bracket portion attached to a cable attachment bracket.

14. The cover deployment system of claim 13, wherein the cable attachment bracket includes a first end having a substantially planar sliding surface and a bow mounting groove opposite the planar sliding surface, the bow mounting groove configured for attachment to a distal end of a bow of one of the bow assemblies, and a second end having an inboard portion and an outboard portion and configured for sliding attachment to one of the pairs of cables;
wherein a first cable groove is formed on an outwardly facing surface of the inboard portion and a second cable groove is formed on an inwardly facing surface of the outboard portion; and
wherein prior to attachment of the cable attachment bracket to the one of the pairs of cables, the inboard portion and the outboard portion of the second end have a V-shaped traverse section and define an open position.

15. The cover deployment system of claim 14, wherein when the one of the pairs of cables is positioned within the first and second cable grooves, and wherein the inboard portion and the outboard portion of the second end are urged toward each other, the inboard portion and the outboard portion of the second end define a closed position such that the first and second cable grooves define a cable channel.

16. The cover deployment system of claim 15, wherein the one of the pairs of cables is slidably mounted within the cable channel.

17. The cover deployment system of claim 1, further including a cable tensioner mounted to the trailer and configured to apply tension to at least one of the pair of cables.

18. The cover deployment system of claim 17, wherein the cable tensioner includes:
a tension pulley;
a bracket assembly;
a tension mechanism mounted to the bracket assembly; and
a spring within the bracket assembly and configured to apply the tension to the at least one of the pair of cables.

* * * * *